A. P. BRUSH.
FRONT AXLE CONSTRUCTION.
APPLICATION FILED JUNE 5, 1917.
Reissued Nov. 11, 1919.
14,750.
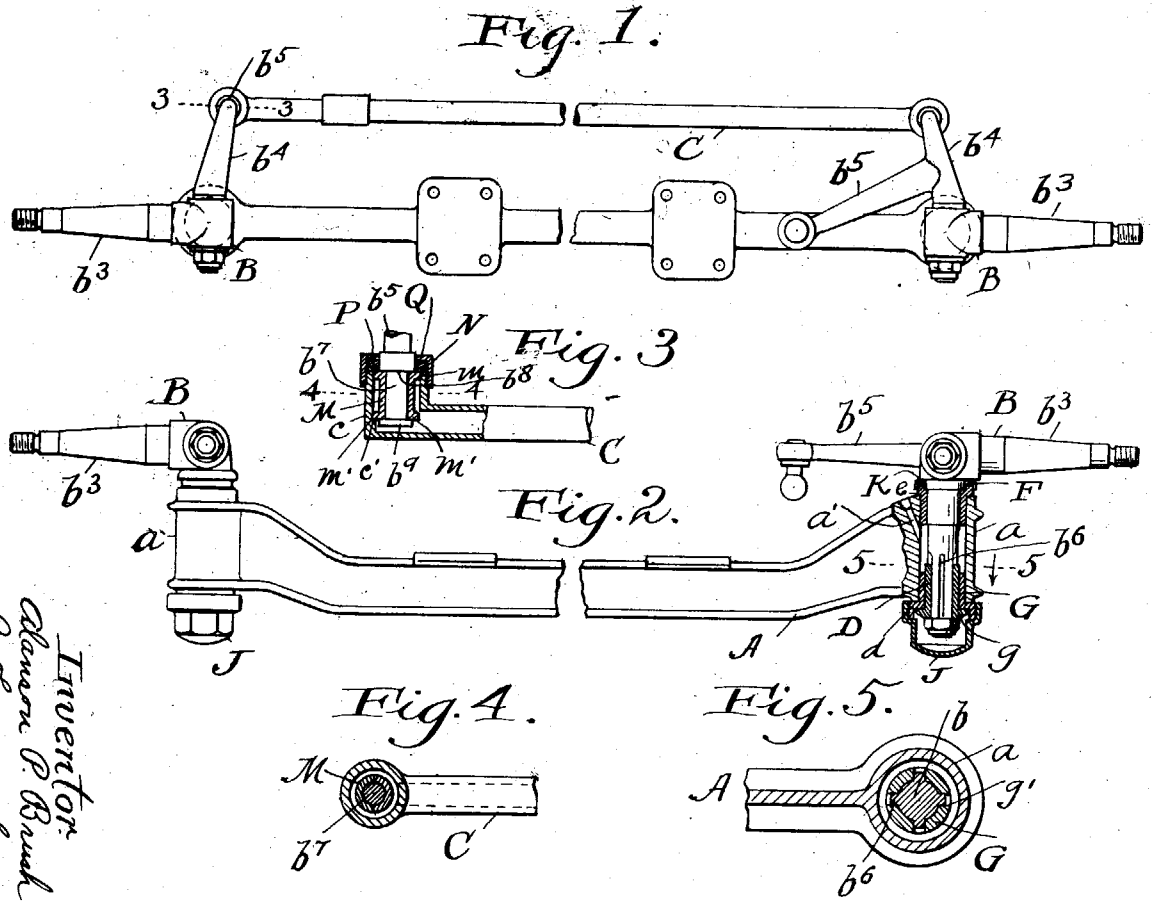
Inventor
Alanson P. Brush
By Thurston & Rice
Attys.

UNITED STATES PATENT OFFICE.

ALANSON P. BRUSH, OF DETROIT, MICHIGAN.

FRONT-AXLE CONSTRUCTION.

14,750. Specification of Reissued Letters Patent. Reissued Nov. 11, 1919.

Original No. 1,223,469, dated April 24, 1917, Serial No. 874,606, filed November 30, 1914. Application for reissue filed June 5, 1917. Serial No. 172,965.

*To all whom it may concern:*

Be it known that I, ALANSON P. BRUSH, a citizen of the United States, residing at Detroit, in the county of Wayne and State of Michigan, have invented a certain new and useful Improvement in Front-Axle Construction, of which the following is a full, clear, and exact description.

This invention relates to improvements in those parts of the front axle mechanism of a motor car which have to do with steering the vehicle; and the chief object of the invention is to insure the proper lubrication of the relatively movable engaging surfaces.

The invention consists in the construction and combination of parts hereinafter described and pointed out definitely in the appended claims.

In the drawing Figure 1 is a plan view of a front axle in which the present invention is embodied. Fig. 2 is a front view partly sectioned of the said axle mechanism. Fig. 3 is a vertical section in the plane of line 3—3 on Fig. 1. Fig. 4 is a horizontal section in the plane of line 4—4 on Fig. 3; and Fig. 5 is a horizontal section in line 5—5 on Fig. 2.

In the specific exemplification and embodiment of the invention shown in the drawing, A represents the front axle, which is provided at its ends with two vertical sleeves $a$, $a$.

B, B. represent the two steering knuckles. Each has a supporting spindle $b$ which is rotatably mounted in one of said sleeves, $a$, as hereinafter described. Each steering knuckle has also a wheel spindle $b^3$, on which one of the front steering wheels of the vehicle is to be mounted in the usual way. Each knuckle has also an arm $b^4$; and these two arms $b^4$ are pivotally connected with opposite ends of the link C in order that both steering knuckles may be turned simultaneously about the axes of the supporting spindles. One of these knuckles has also an arm $b^{10}$ which is for connection by suitable mechanism with the steering wheel of the vehicle.

The manner in which each of the spindles $b$ is rotatably mounted in one of the sleeves $a$ is clearly shown at the right side of Fig. 2. A flanged bushing E is driven into the upper end of said sleeve $a$ until its outwardly extended flange $e$ engages the top of the sleeve. A flange bushing D is driven tightly into the lower end of each sleeve until the flange $d$ at the lower end of said bushing engages the lower end of said sleeve $a$. When so tightly driven into the sleeve they become, in effect, parts of said sleeve, and they furnish the fixed cylindrical bearings for the spindle $b$. Said spindle adjacent to its upper end is rotatably mounted in the bushing E. Said spindle near its lower end goes through and has a tongue and groove connection with a bearing sleeve G which is rotatably mounted in the bushing D,—the tongues $b^6$ being preferably formed on the spindle and the grooves $g'$ being preferably formed in and cut through the sleeve G. This sleeve G projects below the bushing D; and this projecting end is formed with an outwardly extending flange $g$. The upper surface of the flange $g$, and the lower end of the bushing D are the load supporting surfaces of the described mechanism; and obviously they ought to be well lubricated at all times. These load supporting surfaces may be finished before the bushing D and sleeve G are assembled in connection with the other parts, and this irrespective of whether said surfaces are to be plain, as shown, or are to be adapted for coöperation in the well known manner, with interposed anti-friction balls.

A curved washer F may be fitted around the upper end of the spindle $b$ in such wise that its edges embrace the upper end of the bushing E, and a felt washer K may be placed within this curved washer so as to engage the top of said bushing and make a dust tight joint.

A nut H is screwed onto the projecting lower end of the spindle until the load supporting surfaces of the sleeve G and bushing D are in proper relative position. Finally a cup nut J is screwed into the threaded periphery of the flange $d$.

It is to be noted the construction as above described in detail, constitutes good practical specific means for forming at each end of the axle a lubrication well which is closed at its lower end and open at its upper end for the insertion of the spindle which is rotatably mounted therein. Also that the lower end of this well is abruptly enlarged in diameter,—which result is attained by screwing the cup nut onto the outer periphery of the flange $d$ on the projecting lower end of the bushing sleeve D. It is likewise evident that the flanged sleeve G becomes in effect a part of the spindle; and that, when the nut H acts to limit the downward movement of said sleeve on the spindle, the flange $g$, which lies in the enlarged part of the lubricating well, furnishes a thrust bearing which by coöperation with the upper wall of the enlarged part of said well, *i. e.*, the lower flanged end of the sleeve D, supports the weight of the axle and its load.

An oil hole $a'$ is formed through the wall of sleeve $a$, and through this oil may be poured in such a quantity that it will fill the space within the sleeve $a$ around the spindle $b$, and may also fill the cup nut J. Obviously, this oil will keep the load supporting surfaces of the sleeve G and the bushing D thoroughly lubricated.

The arm $b^4$ of each knuckle has its outer end $b^5$ bent down so that its axis is substantially parallel with the axis of the spindle $b$. The rod C, which is preferably tubular, has at each end a vertical sleeve $c$ which opens from the top. The down turned end $b^5$ of the arm $b^4$ extends into this sleeve $c$, and has within the sleeve a part $b^7$ of reduced diameter between two annular flanges $b^8$ and $b^9$. A longitudinally split bushing M is fitted around this part $b^7$ between the two flanges referred to; and it has at its ends outwardly extended annular flanges $m$, $m'$, which fit the sleeve $c$, and therefore leave between its smaller middle part and the sleeve a space for oil; the lower flange $m'$ rests upon an internal shoulder $c'$ within the sleeve $c$. A cap nut N embraces the end $b^9$ above the flange $b^8$, and screws onto the upper end of the sleeve $c$. This cap nut may contain a metal washer P and a felt washer Q.

The tubular rod C, or, at least, the parts near the ends thereof are to be filled with oil. However little oil there may be in this tubular rod, the swaying of the vehicle sidewise and the jars incident to use will insure that this oil will be splashed upon the bearing surfaces of the bushing M and the part $b^7$ of the arm $b^4$.

From the foregoing it will appear that the bearings for the two spindles, and for the two down turned ends $b^5$ of the arms $b^4$, have certain common characteristics. That is to say, in each case the non-rotating member has a lubrication well, and the bearing surfaces carried by said non-rotatable member are in said well. Also that said well has its only opening through the top, and that the rotatable member passes into the well through said opening and substantially fills the latter, and carries bearing surfaces for coöperation with the bearing surfaces carried by the non-rotatable member, whereby the said engaging bearing surfaces are in direct contact with the lubrication therein.

The novel and patentable characteristics of the connection between the cross tie rod and the arms $b^4$ of the steering knuckles are reserved as the subject matter of another application which has been filed to cover same, namely, application Serial No. 133,543, filed Nov. 27, 1916.

Having described my invention, I claim:—

1. In front axle construction, the combination of an axle having at each end a vertical sleeve and the following mechanism associated therewith, viz: a steering knuckle having a supporting spindle which extends down through said sleeve and is rotatively mounted in the upper end thereof, a bearing sleeve which embraces said spindle and has a tongue and groove connection therewith and is rotatably mounted in the lower end of said axle sleeve and has an external flange below said axle sleeve for supporting the latter, and a nut which screws onto the lower end of said spindle.

2. In front axle construction, the combination of an axle having at each end a vertical sleeve and the following mechanism associated therewith, viz: a steering knuckle having a supporting spindle which extends down through said sleeve and is rotatively mounted in the upper end thereof, a bearing sleeve which embraces said spindle and has a tongue and groove sliding connection therewith and is rotatably mounted in the lower end of said axle sleeve and has an external flange below said axle sleeve for supporting the latter, a nut which screws onto the lower end of said spindle, and means for introducing oil into the axle sleeve around the spindle between the upper and lower bearings thereof.

3. In front axle construction, the combination of an axle having at each end a vertical sleeve, and the following mechanism associated therewith, viz: a steering knuckle having a supporting spindle which extends down through said sleeve and is rotatively mounted in the upper end thereof, a bearing sleeve which embraces said spindle and has a tongue and groove sliding connection therewith and is rotatably mounted in the lower end of said axle sleeve and has an external flange below said axle sleeve for supporting the latter, a nut which screws onto the lower end of said spindle, means for introducing oil into the axle sleeve around the spindle between the upper and lower bearings thereof, and a cup nut removably secured to the lower end of the axle sleeve.

4. In front axle construction, the combination of an axle having at each end a vertical sleeve and the following mechanism associated with each of said axle sleeves, viz: a bushing fixed in the upper end of said sleeve and having an outwardly extended flange which engages with the upper end of said sleeve, a bushing fixed in the lower end of the sleeve having an outwardly extended flange which engages the lower end of said sleeve, a steering knuckle having a spindle, the upper portion of which is rotatably mounted in the upper bushing referred to, a bearing sleeve which embraces the spindle and has a tongue and groove connection therewith and is rotatably mounted in the lower bushing, said bearing sleeve having an outwardly extended flange whose upper surface engages the lower surface of the lower bushing, a nut which screws onto the lower end of this spindle, and means for introducing oil into the axle sleeve between the two bushings therein.

5. In front axle construction, the combination of an axle having at each end a vertical sleeve and the following mechanism associated with each of said axle sleeves, viz: a bushing fixed in the upper end of said sleeve and having an outwardly extended flange which engages with the upper end of said sleeve, a bushing fixed in the lower end of the sleeve having an outwardly extended flange which engages the lower end of said sleeve, a steering knuckle having a spindle, the upper portion of which is rotatably mounted in the upper bushing referred to, a bearing sleeve which embraces the spindle and has a tongue and groove connection therewith and is rotatably mounted in the lower bushing, said bearing sleeve having an outwardly extended flange whose upper surface engages the lower surface of the lower bushing, a nut which screws onto the lower end of this spindle, means for introducing oil into the axle sleeve between the two bushings therein and a cup nut which screws onto the flange of the lower bushing.

6. In front axle construction, the combination of an axle having at each end a vertical sleeve and the following mechanism associated with each of said axle sleeves, viz: a bushing fixed in the upper end of said sleeve and having an outwardly extended flange which engages with the upper end of said sleeve, a bushing fixed in the lower end of the sleeve having an outwardly extended flange which engages the lower end of said sleeve, a steering knuckle having a spindle, the upper portion of which is rotatably mounted in the upper bushing referred to, a bearing sleeve which embraces the spindle and has a tongue and groove connection therewith and is rotatably mounted in the lower bushing, said bearing sleeve having an outwardly extended flange whose upper surface engages the lower surface of the lower bushing, a nut which screws onto the lower end of this spindle, means for introducing oil into the axle sleeve between the two bushings therein and a cup nut which screws onto the flange of the lower bushing, and a curved washer embracing the spindle and having its edges embracing also the upper end of the upper bushing, and having packing material confined between said washer and the upper end of the bushing.

7. In front axle construction, the combination of an axle having at each end a lubrication well which is closed at the bottom and open at the top, two steering knuckles each having a spindle which extends downward into the adjacent lubrication well and is rotatably mounted therein, and a thrust bearing in the lower end of each well between the spindle therein and the axle by which the down thrust of the axle is supported by the spindle.

8. In front axle construction, the combination of an axle having at each end a lubrication well which is closed at the bottom and open at the top and is of abruptly enlarged diameter adjacent the lower end thereof, two steering knuckles each having a spindle which extends down into the adjacent lubrication well,—there being within the small diametered upper part of the well bearing surfaces for the spindle concentric with the spindle whereby the spindle is rotatably mounted, and said spindle being provided within the enlarged lower part of said well with an outwardly extended flange, there being thrust bearing surfaces within the enlarged part of said well between the upper surface of said flange on the spindle and the upper wall of the enlarged part of said well.

9. In front axle construction, the combination of an axle having at each end a vertical sleeve, which extends through the axle from top to bottom, and the following parts associated with each of said sleeves, viz: a bushing fitted in the upper end of said sleeve and having an outwardly extended flange which engages the upper end of said sleeve, a bushing fitted in the lower end of said sleeve and having an outwardly extended flange which engages the lower end of said sleeve, a cup nut which screws onto the outer periphery of the projecting lower end of the last named bushing, a steering knuckle having a spindle which extends down through said sleeve from the top thereof and is rotatably mounted within said bushing, and has below said sleeve and within said cup nut an outwardly extended flange which by coöperation with the lower end of the lower bushing furnishes a down thrust bearing for the axle.

10. In front axle construction, the combination of an axle having at each end a vertical sleeve which is closed at its lower end and open at its upper end, a steering knuckle which is associated with each of said sleeves and which has a vertical spindle that extends down into said sleeve through the open upper end thereof and is rotatably mounted in said sleeve, and means preventing the longitudinal movement of said spindle in said sleeve.

11. In front axle construction, the combination of an axle having at each end a vertical sleeve, and a cup which is secured over the lower end of each sleeve thereby closing said lower end and forming a lubrication well having an opening through the top, a steering knuckle which is associated with each of said lubrication wells and which has a spindle that extends down through the opening in the upper end thereof and is rotatably mounted in said sleeve, and means within said sleeve preventing the longitudinal movement of said spindle in said sleeve.

In testimony whereof, I hereunto affix my signature.

ALANSON P. BRUSH.